(12) United States Patent
Szmania et al.

(10) Patent No.: US 11,236,642 B2
(45) Date of Patent: Feb. 1, 2022

(54) VALVE LIFTER ANTI-ROTATION DEVICE AND VALVE LIFTER ASSEMBLY IN VALVE ACTUATION SYSTEM

(71) Applicant: Caterpillar Inc., Peoria, IL (US)

(72) Inventors: Terrence Lee Szmania, Chillicothe, IL (US); Kshitij Anilkumar Shah, Dunlap, IL (US); Vikram Kulkarni, Shrirampur (IN); Sivakumar Dharmaraj, Chennai (IN)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/866,044

(22) Filed: May 4, 2020

(65) Prior Publication Data

US 2021/0340885 A1 Nov. 4, 2021

(51) Int. Cl.
| | |
|---|---|
| *F01L 1/18* | (2006.01) |
| *F01L 1/14* | (2006.01) |
| *F01L 1/047* | (2006.01) |
| *F16H 53/06* | (2006.01) |
| *F01L 1/46* | (2006.01) |

(52) U.S. Cl.
CPC .............. *F01L 1/146* (2013.01); *F01L 1/047* (2013.01); *F01L 1/46* (2013.01); *F16H 53/06* (2013.01); *F01L 2307/00* (2020.05); *F01L 2800/16* (2013.01)

(58) Field of Classification Search
CPC ... F01L 1/146; F01L 1/46; F01L 1/047; F01L 2307/00; F01L 2800/16; F16H 53/06
See application file for complete search history.

(56) References Cited

U.S. PATENT DOCUMENTS

| | | | |
|---|---|---|---|
| 3,267,919 A | 8/1966 | Wortman | |
| 4,773,359 A | 9/1988 | Titolo | |
| 5,088,455 A | 2/1992 | Mortez | |
| 5,253,621 A * | 10/1993 | Dopson | F01L 1/25 123/90.16 |
| 5,261,361 A | 11/1993 | Speil | |
| 5,263,386 A | 11/1993 | Campbell | |
| 5,501,187 A | 3/1996 | Speil et al. | |
| 5,546,899 A | 8/1996 | Sperling et al. | |
| 5,678,514 A | 10/1997 | Mazella et al. | |
| 6,257,189 B1 | 7/2001 | Mortez et al. | |
| 6,405,699 B1 * | 6/2002 | Church | F01L 13/0031 123/90.5 |
| 7,311,074 B2 | 12/2007 | Sailer et al. | |
| 8,181,616 B2 | 5/2012 | Sailer et al. | |
| 8,826,874 B2 | 9/2014 | Hattiangadi et al. | |
| 8,875,676 B2 | 11/2014 | Geyer et al. | |
| 9,772,022 B2 | 9/2017 | Berruet et al. | |

(Continued)

*Primary Examiner* — Zelalem Eshete

(74) *Attorney, Agent, or Firm* — Brannon Sowers & Cracraft

(57) ABSTRACT

An engine valve actuation system includes a rotatable camshaft, a first valve lifter, and a second valve lifter, structured to actuate valves in an engine in response to rotation of cams of the camshaft. The engine valve actuation system includes an anti-rotation device having a collar with a sleeve portion and a boss portion, and a bridge connector structured to couple with one of the valve lifters. Another one of the valve lifters is slidably received in the sleeve portion. The anti-rotation device reciprocates with the one of the valve lifters, and each of the valve lifters is restricted from rotation during service.

17 Claims, 3 Drawing Sheets

(56) References Cited

U.S. PATENT DOCUMENTS

| | | |
|---|---|---|
| 9,920,659 B2 | 3/2018 | Ahmed et al. |
| 10,087,788 B2 | 10/2018 | Sasaki |
| 10,167,833 B2 | 1/2019 | Oka |
| 2004/0211375 A1* | 10/2004 | Spath .................. F01L 1/146 |
| | | 123/90.5 |
| 2013/0152885 A1 | 6/2013 | Remala |
| 2016/0160695 A1 | 6/2016 | Hattiangadi |
| 2019/0032520 A1 | 1/2019 | Hittle |
| 2019/0242276 A1 | 8/2019 | Brown |

\* cited by examiner

US 11,236,642 B2

VALVE LIFTER ANTI-ROTATION DEVICE AND VALVE LIFTER ASSEMBLY IN VALVE ACTUATION SYSTEM

TECHNICAL FIELD

The present disclosure relates generally to a valve actuation system, and more particularly to an anti-rotation device for valve lifters.

BACKGROUND

Internal combustion engines typically employ numerous valves to control the fluid connections amongst different parts of the engine, such as intake valves and exhaust valves to open and close intake and exhaust connections to a combustion cylinder. It is common for engine valve actuation to be achieved by a mechanical linkage between a crankshaft of the engine and one or more rotating camshafts, in turn rotatable to actuate the valves. In a typical valve actuation system the camshaft is rotated by a cam gear in mesh with an engine flywheel, and includes a plurality of non-circular cams that engage valve lifters to open engine valves, and permit the engine valves to be closed with biasing springs. Rocker arms are provided to reciprocate back and forth to open and close the valves, with pushrods or other intervening hardware coupling the valve lifters to the rocker arms.

In operation, cam followers such as rollers directly contact the cams and enable the valve lifters to reciprocate within bores in the engine housing. Proper operation generally requires an angular orientation of the valve lifters to be maintained relative to their axes of reciprocation, or permitted to rotate within a relatively tightly controlled range. Internal combustion engine operation is a dynamic process, however. Valve lifters can become misaligned, potentially requiring service or even resulting in catastrophic engine failure. Many designs for limiting rotation of valve lifters have been proposed over the years, ranging from geometry of the valve lifters themselves, relative to one another and/or relative to the engine housing, to specialized spring clips coupled with valve lifters and structured to engage with parts of the engine housing. One known anti-rotation roller valve lifter is set forth in U.S. Pat. No. 8,826,874. The '874 patent proposes a roller lifter having a first end with a first diameter, and a second end with a greater diameter and having a flat surface configured to engage a corresponding flat surface on an adjacent lifter. The strategy set forth in the '874 patent may have various applications, but there is always room for improvement and development of alternative strategies.

SUMMARY OF THE INVENTION

In one aspect, an anti-rotation device for valve lifters in a valve actuation system includes a collar having a sleeve portion and a boss portion. The sleeve portion includes an inner peripheral guide surface forming a lifter bore defining a bore center axis. The inner peripheral guide surface has a shape that is varied, circumferentially around the bore center axis, to limit rotation of a first valve lifter slidably received in the lifter bore. The boss portion includes an outer peripheral surface facing a radially outward direction. The anti-rotation device further includes a bridge connector projecting from the outer peripheral surface for engagement with a second valve lifter.

In another aspect, a valve lifter assembly includes an anti-rotation device having a collar with a sleeve portion including, an inner peripheral guide surface forming a lifter bore and a boss portion having an outer peripheral surface. The anti-rotation device further includes a bridge connector projecting from the outer peripheral surface. The valve lifter assembly further includes a valve lifter coupled to the anti-rotation device and defining a longitudinal lifter axis extending between a first axial body end and a second axial body end. The valve lifter includes a lifting surface facing a direction of the first axial end, and a cam follower mounted to the second axial body end.

In another aspect, an engine valve actuation system includes a rotatable camshaft having a first cam with a first cam profile about a cam axis of rotation, and a second cam having a second cam profile, different from the first cam profile, about the cam axis of rotation. The engine valve actuation system further includes a first valve lifter having a lifting surface structured to actuate a first valve in the engine, and a cam follower in contact with the first cam to reciprocate the first valve lifter in response to rotation of the first cam. The engine valve actuation system further includes a second valve lifter having a lifting surface structured to actuate a second valve in the engine, and a cam follower in contact with the second cam to reciprocate the second valve lifter in response to rotation of the second cam. The engine valve actuation system still further includes an anti-rotation device including, a collar having a sleeve portion with an inner peripheral guide surface forming a lifter bore and a boss portion having an outer peripheral surface, and a bridge connector projecting from the outer peripheral surface. The first valve lifter is slidably received in the lifter bore and in contact with the inner peripheral guide surface to inhibit rotation of the first valve lifter. The second valve lifter is fixedly coupled to the bridge connector, such that the anti-rotation device is moved with the second valve lifter, and relative to the first valve lifter, between a lifted position and a dropped position in response to rotation of the second cam.

DETAILED DESCRIPTION

Figure 1:
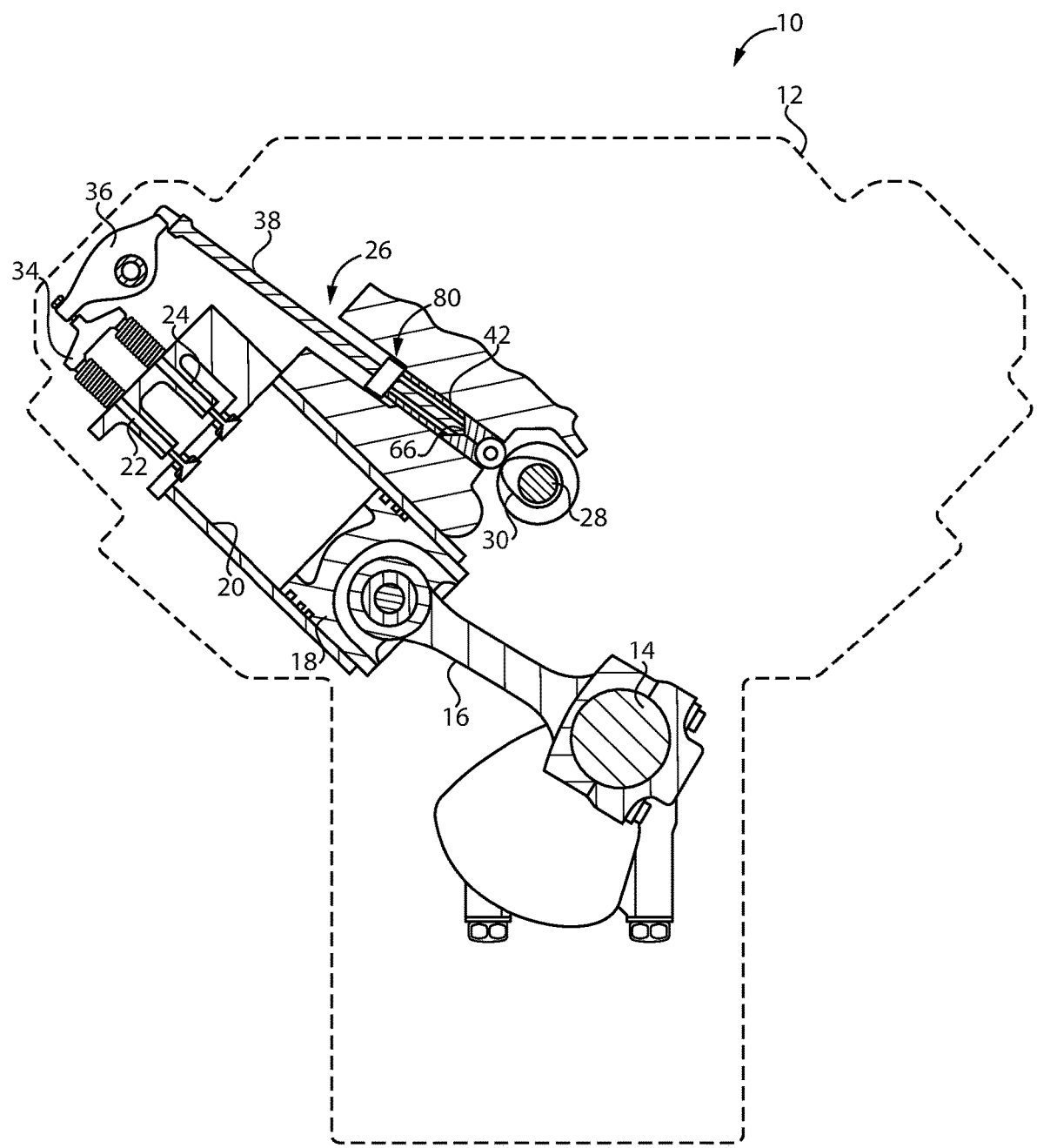
FIG. 1 is a sectioned side diagrammatic view of an internal combustion engine, according to one embodiment.

Referring to FIG. 1, there is shown an engine 10 according to one embodiment. Engine 10 may include an internal combustion engine, such as a compression-ignition diesel engine structured to operate on diesel distillate fuel, however, the present disclosure is not thereby limited. Engine 10 includes an engine housing 12, and a crankshaft 14 supported for rotation in engine housing 12. One or more combustion cylinders 20 are formed in engine housing 12, with a piston 18 structured to reciprocate in each combustion cylinder 20 between a top-dead-center position and a bottom-dead-center position in a conventional four-cycle pattern. Combustion cylinders 20, one of which is shown and referred to in the singular hereinafter, may be arranged in any suitable configuration such as a V-pattern, an in-line pattern, or still another. A connecting rod 16 couples crankshaft 14 to piston 18 in a generally conventional manner. A first engine valve 22 and a second engine valve 24 are structured to open and close fluid communication between combustion cylinder 20 and gas exchange conduits formed in engine housing 12. One of engine valves 22 and 24 can include an intake valve and the other an exhaust valve, however, in a practical implementation strategy both of engine valves 22 and 24 are intake valves or exhaust valves, with a valve bridge 34 coupling engine valves 22 and 24 to a common rocker arm 36. It will be appreciated that additional engine valves can be associated with combustion cylinder 20, but are not visible in the view of FIG. 1.

Rocker arm 36 is part of an engine valve actuation system 26. Valve actuation system 26 may include a rotatable camshaft 28 that is coupled to rotate with crankshaft 14 such as by way of suitable intervening gearing. Valve actuation system 26 further includes a plurality of valve lifters, one of which is shown at 42. Valve lifter 42 is coupled by way of a pushrod 38 with rocker arm 36 and reciprocates in engine housing 12 to reciprocate rocker arm 36 to open and close engine valves 22 and 24 together. Valve lifter 42 includes a lifting surface 66 that is contacted by pushrod 38. In other embodiments, a valve lifter might be associated with a single pushrod and a single engine valve, or might be directly coupled with a rocker arm, or reciprocated to actuate an engine valve according to still another architecture. An anti-rotation device 80 is shown coupled with valve lifter 42 in FIG. 1, the details and functionality of which are further discussed herein.

Figure 2:
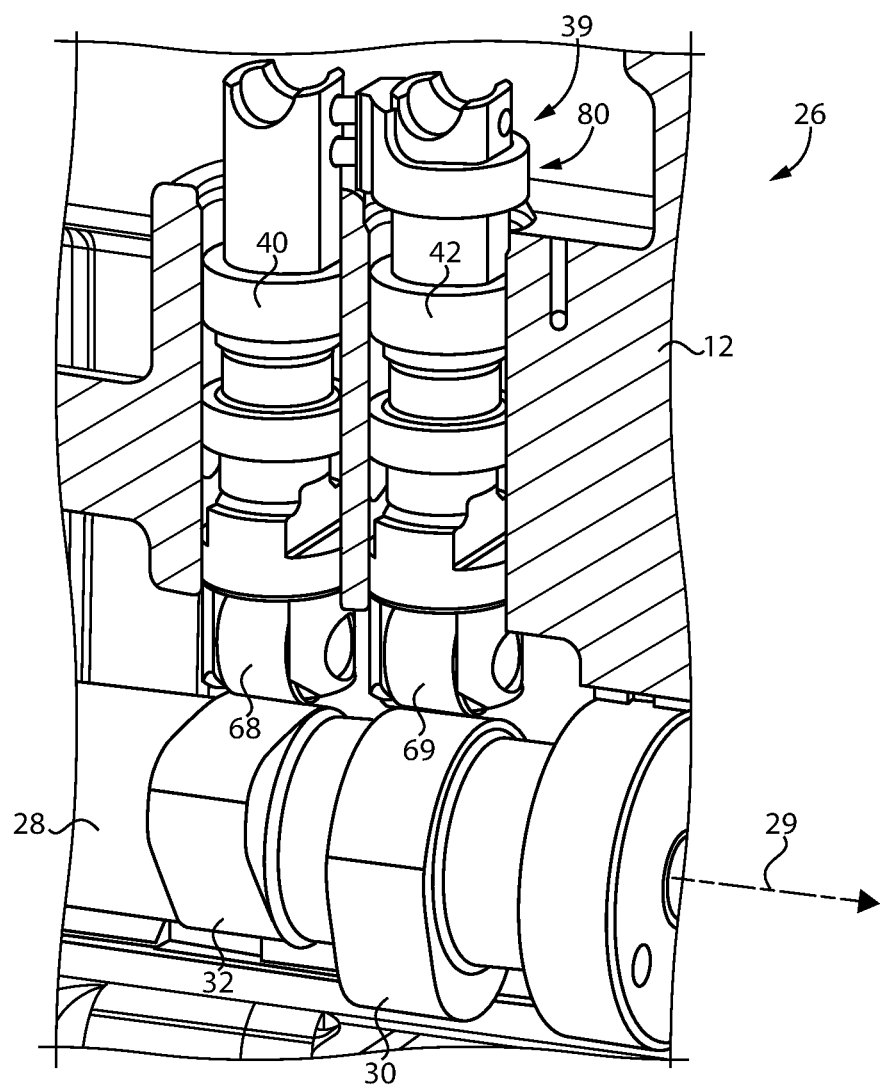
FIG. 2. is a partially sectioned diagrammatic view, in perspective, of a valve actuation system, according to one embodiment.
Figure 3:
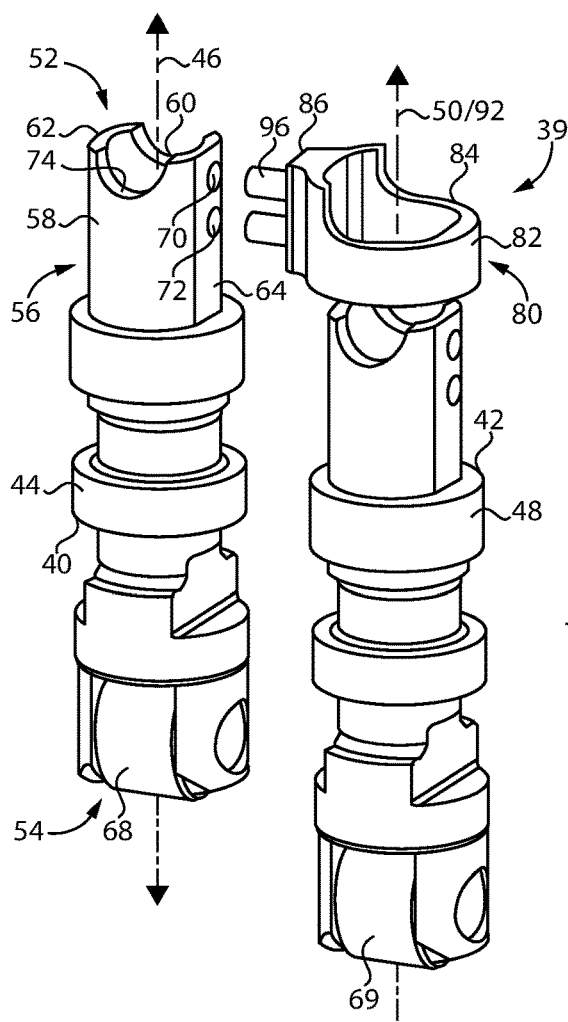
FIG. 3 is a disassembled view of a valve assembly, according to one embodiment.

Referring now to FIGS. 2 and 3, there are shown additional details of valve actuation system 26, including a valve lifter assembly 39. Valve lifter assembly 39 includes a first valve lifter 40, and a second valve lifter 42. It should be appreciated that description and discussion herein of either of valve lifters 40 or 42 can be understood to refer by way of analogy to the other of valve lifters 40 and 42, except where otherwise indicated or apparent from the context. Accordingly, the terms "first" and "second" are used herein merely for convenience. First valve lifter 40 and second valve lifter 42 (hereinafter "valve lifter 40" and "valve lifter 42") may be substantially identical and interchangeable for service in engine 10, however, the present disclosure is not thereby limited.

Valve lifter 40 includes a lifter body 44, defining a longitudinal lifter axis 46. Valve lifter 42 includes a lifter body 48 defining a longitudinal lifter axis 50. Lifter axes 46 and 50 may be oriented perpendicular to a cam axis of rotation 29 defined by camshaft 28. In the illustrated embodiment camshaft 28 includes a first cam or cam lobe 30 having a first cam profile about cam axis of rotation 29, and a second cam or cam lobe 32 having a second cam profile different from the first cam profile, about cam axis of rotation 29. The first cam profile and the second cam profile may be substantially identical in shape, but have different angular orientations about cam axis of rotation 29. Valve lifter 40 may be structured to actuate one or more intake valves in engine 10, with valve lifter 42 being structured to actuate one or more exhaust valves in engine 10, or vice versa. Each of valve lifters 40 and 42 may be coupled to anti-rotation device 80, as further discussed herein.

In valve lifter 40, as shown in FIG. 3, longitudinal lifter axis 46 extends between a first axial body end 52 and a second axial body end 54. Valve lifter 40 and valve lifter 42 may each include a lifting surface, shown in valve lifter 42 at 66 as noted above, that faces a direction of the corresponding first axial lifter body end. Valve lifter 40 includes a cam follower 68 mounted to second axial body end 54. Valve lifter 42 includes a cam follower 69 analogously mounted. Each of cam followers 68 and 69 can include a roller in contact with the corresponding cam 32 and 30, respectively. Contact between cam follower 68 and first cam 32 enables valve lifter 40 to reciprocate in response to rotation of cam 32. Contact between cam follower 69 and cam 30 enables valve lifter 42 to reciprocate in response to rotation of cam 30.

As further illustrated, valve lifter 40, and by analogy valve lifter 42, includes a necked-down portion 56. Necked-down portion 56 may include a plurality of arcuate outer surfaces 58 and 60 and a plurality of planar outer surfaces 62 and 64, in an alternating arrangement with arcuate outer surfaces 58 and 60. A cutout 74 may also be formed in first axial body end 52, to remove mass in compensation for a mass of anti-rotation device 80 carried by valve lifter 40 as further discussed herein. Valve lifter 40 may also include a first carrying bore 70 and a second carrying bore 72, formed in and opening at one of the plurality of planar outer surfaces, in the illustrated case surface 64. Carrying bores 70 and 72 are used for coupling valve lifter 40 to anti-rotation device 80 as further discussed herein. The substantially identical configurations of valve lifter 40 and valve lifter 42 can enable coupling with anti-rotation device 80 in either of two configurations, as will be apparent from FIG. 3. Embodiments are contemplated where valve lifter assembly 39 includes, such as in a service package or kit, an assembly of a valve lifter coupled with anti-rotation device 80 in one of the two possible configurations, as well as embodiments where a valve lifter is coupled with anti-rotation device 80 in the other of the two possible configurations. In still other instances, a service package or kit could include two valve lifters, identical to one another or different, assembled with anti-rotation device 80, or packaged together but not assembled. As will be further apparent from the following description, anti-rotation device 80 may be fixedly coupled to a first one of valve lifters 40 and 42, and slidably coupled with a second one of valve lifters 40 and 42, when positioned for service in engine 10. Coupling between anti-rotation device 80 and valve lifters 40 and 42 when installed in engine 10 will permit reciprocation of each of valve lifters 40 and 42 but limit rotation of each of valve lifters 40 and 42.

Figure 4:
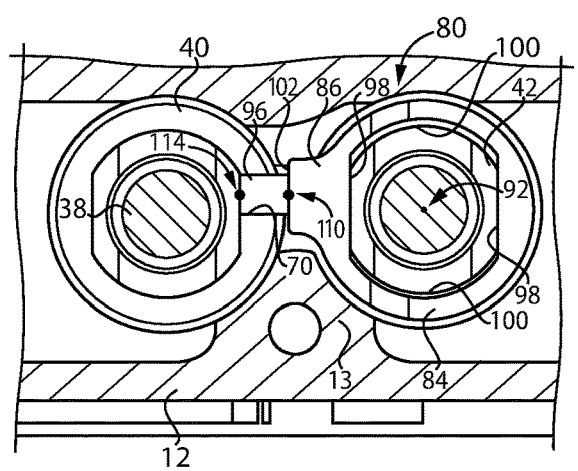
FIG. 4 is a sectioned view through a portion of the engine of FIG. 1.

Referring also now to FIG. 4, there is shown a top view of valve lifters 40 and 42 as they might appear installed in engine 10 and positioned for reciprocation in engine housing 12. Anti-rotation device 80 is coupled with each of valve lifters 40 and 42, and each of valve lifters 40 and 42 can be reciprocated, in and out of the page in the FIG. 4 illustration, but inhibited from rotating. Such functionality is based on the shape and design of anti-rotation device 80, enabling fixed coupling with one of valve lifters 40 and 42, and slidable coupling with the other of valve lifters 40 and 42.

Figure 5:
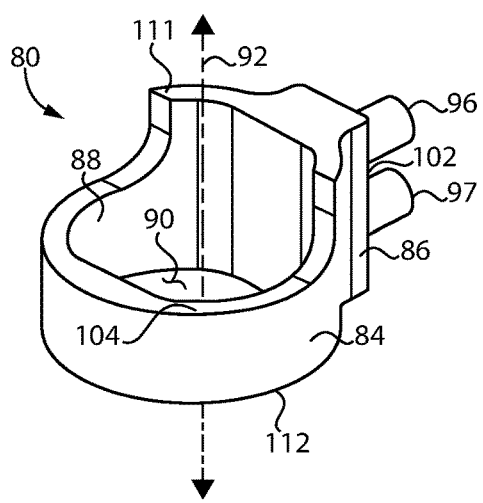
FIG. 5 is a diagrammatic view of an anti-rotation device for valve lifters, according to one embodiment.
Figure 6:
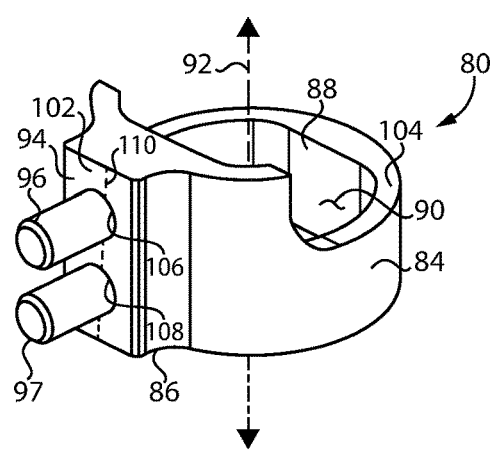
FIG. 6 is another diagrammatic view of the anti-rotation device of FIG. 5, rotated approximately 180° from FIG. 5.

Referring also now to FIG. 5 and FIG. 6 there are shown additional features of anti-rotation device 80. Anti-rotation device 80 includes a collar 82 having a sleeve portion 84 and a boss portion 86. Sleeve portion 84 includes an inner peripheral guide surface 88 forming a lifter bore 90 defining a bore center axis 92. Inner peripheral guide surface 88 has a shape that is varied, circumferentially around bore center axis 92, to limit rotation of a first valve lifter slidably received in lifter bore 90. As discussed above, either of valve lifter 40 or valve lifter 42 could be a first valve lifter slidably received in lifter bore 90. In a practical implementation, inner peripheral guide surface 88 includes a plurality of inner planar surfaces 98 in an alternating arrangement with a plurality of inner arcuate surfaces 100. It will be understood that valve lifter 40, for example, can be slidably received in lifter bore 90 such that outer planar surfaces 62 and 64 are positioned in facing relation to inner planar surfaces 98, and arcuate outer surfaces 58 and 60 are in facing relation to inner arcuate surfaces 100. As a result, while valve lifter 40 can slide within lifter bore 90 it is restricted from rotation about longitudinal lifter axis 46.

Boss portion 86 includes an outer peripheral surface 94 facing a radially outward direction, relative to bore center axis 92. Outer peripheral surface 94 may include an outer planar surface 102 located opposite to one of inner planar surfaces 98, such that a radial thickness of boss portion 86, relative to bore center axis 92, is defined between outer planar surface 102 and the one of inner planar surfaces 98. It can also be seen that sleeve portion 84 includes an arcuate band 104 originating and terminating at boss portion 86. Arcuate band 104 may have a semi-circular or other curvilinear outer profile, and an inner profile, formed by shapes of surfaces 98 and 100.

Anti-rotation device 80 further includes a bridge connector 96 projecting from outer peripheral surface 94 for engagement with a second valve lifter, again, either of valve lifter 40 or valve lifter 42. Anti-rotation device 80 may further include a second bridge connector 97 projecting, in parallel with first bridge connector 96, from outer peripheral surface 94. Also in the illustrated embodiment each of first bridge connector 96 and second bridge connector 97 includes a cylindrical protrusion. Embodiments are contemplated where first bridge connector 96 and second bridge connector 97 are separate pieces installed in and supported within boss portion 86. To this end, boss portion 86 may include a first connector bore 106 and a second connector bore 108 formed therein, and each opening at outer peripheral surface 94 within outer planar surface 102. First bridge connector 96 and second bridge connector 97 are supported, respectively, in first connector bore 106 and second connector bore 108. Each of first bridge connector 96 and second bridge connector 97 may include a dowel, such as a cylindrical metallic dowel, interference-fitted in first connector bore 106 and second connector bore 108, respectively. A suitable adhesive, such as those available under the trade name LOCTITE®, may enhance the retention of first and second bridge connectors 96 and 97 within first and second connector bores 106 and 108. Collar 82 may include a single fabricated metallic piece. In other embodiments, one or more bridge connectors might be formed integrally with a collar. Accordingly, collar 82 and one or more bridge connectors 96 and 97 might include a single fabricated piece formed of a metallic material and machined to a suitable shape, or potentially a different material such as a polymeric material or a glass polymer material that is molded and/or machined.

Returning to FIG. 4, it can be seen from the top view of the illustration that first bridge connector 96 is visible and received within carrying bore 70, while second bridge connector 97 is hidden and behind the plane of the page. As shown, first bridge connector 96 and second bridge connector 97 are offset from one another in an axial direction, in and out of the page in FIG. 4, and aligned with one another in a circumferential direction around bore center axis 92. It can also be seen from FIG. 4 that outer peripheral surface 94 defines a longitudinal midline 110 parallel to bore center axis 92. First bridge connector 96 and second bridge connector 97 are offset, generally in the circumferential direction, relative to longitudinal midline 110. The offset of bridge connectors 96 and 97 can be understood to mean that longitudinal midline 110 does not intersect center axes of bridge connectors 96 and 97, not necessarily that midline 110 does not intersect bridge connectors 96 and 97 themselves. Planar outer surface 64 of valve lifter 40 may also define a longitudinal midline 114, with bridge connectors 96 and 97 and carrying bores 70 and 72 being analogously offset, in a circumferential direction around lifter axis 46, relative to longitudinal midline 114. As illustrated in FIG. 4, an engine housing protrusion 13 is located adjacent to each of valve lifter 40 and valve lifter 42 when installed for service in engine 10. The offset of first and second bridge connectors 96 and 97 relative to longitudinal midlines 110 and 114 assists in packaging valve assembly 39 for service in engine 10 without interference with engine housing protrusion 13 or other structures. Also in the illustrated embodiment, anti-rotation device 80 includes a first axial end surface 111, and a second axial end surface 112. Second axial end surface 112 may be substantially planar, whereas first axial end surface 111 may include two separate substantially planar surfaces, including a first planar portion located upon arcuate band 104, and a second planar portion located in part upon arcuate band 104 and in part upon boss portion 86. An axial thickness of anti-rotation device 80 between first axial end surface 111 and second axial end surface 112 may be less through arcuate band 104 than through boss portion 86, as depicted in the drawings.

INDUSTRIAL APPLICABILITY

Referring to the drawings generally, during operation of engine 10 a mixture of fuel and air is combusted in combustion cylinder 20 to urge piston 18 toward a bottom dead center position to rotate crankshaft 14 by way of connecting rod 16. Camshaft 28 may be rotated, typically at one-half engine speed, in a conventional four-cycle pattern, causing valve lifters 40 and 42 to reciprocate to open and close the associated engine valves. Each of valve lifter 40 and valve lifter 42 includes a lifting surface in contact with a pushrod and structured to actuate the respective engine valves as described, with the respective cam followers 68 and 69 contacting cams 32 and 30 on camshaft 28 to reciprocate valve lifters 40 and 42 at suitable timings.

As discussed herein, anti-rotation device 80 may be fixedly coupled to bridge connector 96 and bridge connector 97. Valve lifter 42 may be slidably received in lifter bore 90. Contact between inner peripheral guide surface 88 and valve lifter 42 inhibits rotation of valve lifter 42. The fixed coupling of valve lifter 40 to bridge connector 96 and bridge connector 97 causes anti-rotation device 80 to move with valve lifter 40, relative to valve lifter 42, between a lifted position and a dropped position in response to rotation of camshaft 28, in particular rotation of cam 32 in the illustrated embodiment. In FIG. 2, valve lifter 40 and valve lifter 42 are shown approximately as they might appear at lowered or dropped positions, such that the respective engine valves are closed. As camshaft 28 is rotated, about cam axis of rotation 29, valve lifter 40 will be urged upward and downward in response to rotation of cam 32, causing anti-rotation device 80 to move upward and downward relative to valve lifter 42, depending upon the present lifted or lowered state of valve lifter 42. Different cam profiles, and/or cam angular orientations, can give different results respecting whether relative movement is upward versus downward at any given time, however, in all cases anti-rotation device 80 and valve lifter 42 are free to reciprocate relative to one another but valve lifter 42 is inhibited from rotating or restricted to rotation in a relatively narrow range about lifter axis 50.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed:

1. An anti-rotation device for valve lifters in a valve actuation system comprising:
   a collar including a sleeve portion and a boss portion;
   the sleeve portion including an inner peripheral guide surface forming a lifter bore defining a bore center axis;
   the inner peripheral guide surface having a shape that is varied, circumferentially around the bore center axis, to limit rotation of a first valve lifter slidably received in the lifter bore;
   the boss portion including an outer peripheral surface facing a radially outward direction; and
   first and second bridge connectors projecting from the outer peripheral surface for engagement with a second valve lifter.

2. The device of claim 1 wherein the inner peripheral guide surface includes a plurality of inner planar surfaces in an alternating arrangement with a plurality of inner arcuate surfaces.

3. The device of claim 1 wherein each of the first bridge connector and the second bridge connector are offset from one another in an axial direction and aligned with one another in a circumferential direction.

4. The device of claim 3 wherein a first connector bore and a second connector bore are formed in the boss portion and each opens at the outer peripheral surface, and the first bridge connector and the second bridge connector are supported, respectively, in the first connector bore and the second connector bore.

5. The device of claim 4 wherein each of the first bridge connector and the second bridge connector includes a dowel.

6. The device of claim 1 wherein the outer peripheral surface defines a longitudinal midline parallel to the bore center axis, and the first bridge connector and the second bridge connector bore are offset, in the circumferential direction, relative to the longitudinal midline.

7. An anti-rotation device for valve lifters in a valve actuation system comprising:
   a collar including a sleeve portion and a boss portion;
   the sleeve portion including an inner peripheral guide surface forming a lifter bore defining a bore center axis,
   the inner peripheral guide surface including a plurality of inner planar surfaces in an alternating arrangement with a plurality of inner arcuate surfaces;
   the inner peripheral guide surface having a shape that is varied, circumferentially around the bore center axis, to limit rotation of a first valve lifter slidably received in the lifter bore;
   the boss portion including an outer peripheral surface facing a radially outward direction;
   a bridge connector projecting from the outer peripheral surface for engagement with a second valve lifter;
   the outer peripheral surface includes an outer planar surface located opposite to one of the plurality of inner planar surfaces, and a radial thickness of the boss portion is defined between the outer planar surface and the one of the plurality of inner planar surfaces; and
   the sleeve portion includes an arcuate band originating and terminating at the boss portion.

8. A valve lifter assembly comprising:
   an anti-rotation device including, a collar having a sleeve portion with an inner peripheral guide surface forming a lifter bore and a boss portion having an outer peripheral surface, and first and second bridge connectors projecting from the outer peripheral surface; and
   a valve lifter coupled to the anti-rotation device and defining a longitudinal lifter axis extending between a first axial body end and a second axial body end, and the valve lifter including a lifting surface facing a direction of the first axial end, and a cam follower mounted to the second axial body end.

9. The valve lifter assembly of claim 8 wherein each of the first bridge connector and the second bridge connector includes a cylindrical protrusion.

10. The valve lifter assembly of claim 9 wherein each of the first bridge connector and the second bridge connector includes a dowel supported within the boss portion.

11. The valve lifter assembly of claim 9 wherein the valve lifter includes a first carrying bore and a second carrying bore receiving the first bridge connector and the second bridge connector, respectively, to couple the valve lifter to the anti-rotation device.

12. The valve lifter assembly of claim 11 wherein the lifter bore defines a bore center axis, and wherein each of the first bridge connector and the second bridge connector are offset from one another in an axial direction and aligned with one another in a circumferential direction.

13. The valve lifter assembly of claim 11 further comprising a second valve lifter slidably received within the lifter bore.

14. The valve lifter assembly of claim 8 wherein the valve lifter is fixedly coupled to the bridge connector and has a fixed axial location relative to the collar, and further comprising a second valve lifter slidably received within the lifter bore and having a movable axial location relative to the anti-rotation collar.

15. An engine valve actuation system comprising:
   a rotatable camshaft including a first cam having a first cam profile about a cam axis of rotation, and a second cam having a second cam profile, different from the first cam profile, about the cam axis of rotation;
   a first valve lifter including a lifting surface structured to actuate a first valve in the engine, and a cam follower in contact with the first cam to reciprocate the first valve lifter in response to rotation of the first cam;
   a second valve lifter including a lifting surface structured to actuate a second valve in the engine, and a cam follower in contact with the second cam to reciprocate the second valve lifter in response to rotation of the second cam;

an anti-rotation device including, a collar having a sleeve portion with an inner peripheral guide surface forming a lifter bore and a boss portion having an outer peripheral surface, and first and second bridge connectors projecting from the outer peripheral surface;

the first valve lifter is slidably received in the lifter bore and in contact with the inner peripheral guide surface to inhibit rotation of the first valve lifter; and the second valve lifter includes a first carrying recess and a second carrying recess formed therein and receiving, respectively, the first bridge connector and the second bridge connector, whereby the second valve lifter is fixedly coupled to the bridge connector, such that the anti-rotation device is moved with the second valve lifter, and relative to the first valve lifter, between a lifted position and a dropped position in response to the rotation of the second cam.

16. The system of claim 15 wherein each of the first and second bridge connectors includes a cylindrical protrusion and the first and second carrying recesses are cylindrical bores configured to receive the first and second bridge connectors, respectively.

17. The system of claim 15 wherein:

the inner peripheral guide surface includes a plurality of inner planar surfaces in an alternating arrangement with a plurality of inner arcuate surfaces;

the outer peripheral surface includes an outer planar surface located opposite to one of the plurality of inner planar surfaces, such that a radial thickness of the boss portion is defined between the outer planar surface and the one of the plurality of inner planar surfaces; and the sleeve portion includes an arcuate band originating and terminating at the boss portion.

* * * * *